United States Patent [19]

Corte et al.

[11] 4,083,712

[45] Apr. 11, 1978

[54] NITROGENOUS FERTILIZER COMPOSITIONS

[75] Inventors: Herbert Corte, Opladen; Harold Heller, Cologne; Peter Michael Lange, Cologne; Otto Netz, Cologne, all of Germany

[73] Assignee: Bayer Aktiengesellschaft, Leverkusen, Germany

[21] Appl. No.: 428,264

[22] Filed: Dec. 26, 1973

Related U.S. Application Data

[62] Division of Ser. No. 223,023, Feb. 2, 1972, abandoned.

[30] Foreign Application Priority Data

Feb. 19, 1971 Germany ............................. 2107916

[51] Int. Cl.² .................................................. C05C 9/00
[52] U.S. Cl. .......................................... 71/28; 71/27; 71/1
[58] Field of Search ............................. 71/1, 27–30, 71/63

[56] References Cited

U.S. PATENT DOCUMENTS

| | | | |
|---|---|---|---|
| 3,082,074 | 3/1963 | Handley et al. | 71/1 |
| 3,373,009 | 3/1968 | Pruitt et al. | 71/28 |
| 3,533,774 | 10/1970 | Nautt | 71/1 |

OTHER PUBLICATIONS

Cope et al., J. Agr. Food Chem. 12(2), 151–154 (1964.
Takimoto, Nippon Kagaka Zasshi 82, 1702–1708 (1961).
Calmon et al., "Ion Exchangers in Organic and Biochemistry," Interscience, New York, 1957 (pp. 346–347).

*Primary Examiner*—Charles N. Hart
*Assistant Examiner*—Ferris H. Lander
*Attorney, Agent, or Firm*—Burgess, Dinklage & Sprung

[57] ABSTRACT

Nitrogenous fertilizer compositions comprising a cation exchanger in the form of a salt thereof with a basic carbonic acid derivative containing at least 2 nitrogen groupings, e.g., a salt formed by attaching to a cation exchange material, guanidine, diguanidine, guanylurea, biuretdicyanamide, urazone, melamine, guanine or ammeline, are outstandingly effective in providing gradually-acting, long-lasting fertilizing action.

8 Claims, No Drawings

NITROGENOUS FERTILIZER COMPOSITIONS

This is a division, of application Ser. No. 223,023, filed Feb. 2, 1972, and now abandoned.

The present invention relates to fertilizers, and more particularly to nitrogenous fertilizers.

Efforts have been made for a long time to develop gradually acting, long-lasting nitrogenous fertilizers, the nitrogen supply of which is adapted, in terms both of quantity and of time, to the requirement of the plants.

In general, a distinction can be made between two directions of development:

(1) Use of sparingly soluble compounds, such as are obtained for example by condensation of urea with formaldehyde, acetaldehyde or crotonaldehyde;
(2) Use of ammonium or nitrate ions attached to ion exchangers.

Both directions of development have not hitherto given wholly satisfactory results.

One defect of the nitrogenous fertilizers according to method (1) is that, at the beginning of the fertilizing period, only small amounts of nitrogen are available in dissolved form, so that a short-term fertilizer, for example a nitrate, needs to be applied at the same time to give a greater initial fertilizing effect. As the growth period progresses, increasing amounts of nitrogen are converted into soluble form, but these amounts may cease to correspond to the nitrogen requirement of the plant, so that the nitrogen requirement of the plant and the nitrogen supplied to the plant are matched for only a short time; over-fertilization takes place, and toxic concentrations may occur, since the solubility of these fertilizers depends on temperature and moisture content of the soil. Moreover, long-term fertilization of more than one year is not attained.

The attachment of ammonia to ion exchangers according to (2) leads on the contrary to nitrogenous fertilizers which could cover the nitrogen requirement of the plant for years, but it is found in the course of time that there is a decrease of nitrogen yield, leading to nitrogen deprivation of the plants. Moreover, the nitrogen content of the exchanger charged with ammonia is relatively low, so that there results a high price per unit of nitrogen, i.e., the use of this nitrogen form is not economical. This applies to an even greater degree to exchangers charged with nitrate, since exchangers which are capable of binding nitrate are yet more expensive than those which are able to bind ammonia.

The present invention provides fertilizers in which these disadvantages may be reduced or avoided.

The invention provides nitrogenous fertilizers comprising a cation exchanger in the form of a salt with a basic carbonic acid derivative containing at least two, preferably several, nitrogen groupings. As carbonic acid derivatives for charging the cation exchangers, monomeric, dimeric, trimeric or more highly polymeric carbonic acid derivatives are suitable (cf. Houben-Weyl, Methoden der organischen Chemie, 4th Edition, Volume VIII), in which the nitrogen atoms are attached to the carbon atoms of the carbonic acid.

In the polymeric carbonic acid derivatives, in general several carbonic acid radicals are linked to one another by nitrogen atoms via their carbon atom. Both acyclic and cyclic carbonic acid derivatives are suitable. In the acyclic and cyclic those derivatives are of particular interest in which the oxygen atom of at least one carbonyl group is replaced by the imino group; from the cyclic series, compounds of the type of melamine are to be emphasized.

Suitable basic nitrogen compounds for the production of the aforesaid salts with cation exchangers include for example guanidine, diguanidine, guanylurea, biuretdicyanamide, urazone, melamine, guanine, ammeline. The basicity of the nitrogen compounds is desirably so chosen that the compounds are attached by cation exchangers when their aqueous solutions are passed over the cation exchangers in hydrogen form. Thus, with the use of cation exchangers which contain carboxyl groups as exchanger-active groups, compounds of higher basicity are to be used that in the case of exchangers the exchange-active groups of which are sulphonic acid groups.

Cation exchangers used in the present invention are for example exchangers with sulphonic acid groups and/or carboxyl groups and/or phosphonic acid groups. Inorganic zeolites are also suitable. Cation exchangers are preferred which possess as many ion-exchanging groups as possible per unit of weight, such as carboxyl exchangers based on cross-linked polyacrylic acids or based on cross-linked styrenes which are disulphonated as far as possible, i.e. on average bear more than one, and, if possible, two sulphonic acid groups per benzene nucleus. The exchangers may have a gel structure or may be macroporous.

The salts to be used according to the invention may be obtained in known manner by loading the ion exchangers, preferably in their hydrogen form, with aqueous solutions of the basic nitrogen compounds until a complete saturation of the ion-exchanging groups is achieved.

Besides the above-mentioned nitrogen bases, the cation exchangers may, depending on the nature of the soil, also contain other cations, for example calcium, potassium or magnesium, as well as trace elements, such as iron or manganese.

The cation exchangers charged with the above nitrogen-containing compounds are more or less slowly and lastingly acting nitrogenous fertilizers and can be used as such, optionally in admixture with other fertilizers.

The fertilizer may include a carrier or diluent in addition to the exchanger salt; for example it may include a substrate such as peat.

The fertilizers can be used in the form of beads, as granulates or as powders. They can be mixed with a substrate, such as peat, or can be used as top dressing.

The exchangers also are capable of securing the supply of nitrogen in hydrophonic cultivations.

The salts of cation exchangers to be used according to the invention do not show the initially mentioned side-effects of the exchangers charged with ammonia and tend to result, from the beginning of the growth period onwards, in higher yields, as was shown by tests with grass in Mitscherlich pots. This finding is all the more surprising, as nitrogen-containing compounds of the above nature without attachment to cation exchangers are unsuitable for fertilizing purpose.

The invention provides a method of fostering the yield of crops which comprises applying to an area of cultivation in which the crops are grown a fertilizer according to the invention.

The invention is illustrated by the following examples which, however, are not to be construed as unduly limitative thereof.

TEST EXAMPLES

The preparation of the exchanger salts according to the invention, which were used for the carrying out of the tests below was as follows:

EXAMPLE 1

1100 ml of a strongly acid cation exchanger in the H-form (sulphonated polystyrene, cross-linked with 8% divinylbenzene) were percolated in a filler tube with the necessary amount of an aqueous guanidine solution for complete saturation. The total capacity of the ion exchanger was 2.0 gram-equivalents per liter. The exchanger saturated with guanidine was washed with 2500 ml of water. There were obtained 1000 ml of a nitrogenous fertilizer which contained 2.2 moles of guanidine per liter.

EXAMPLE 2

To 1100 ml of the same cation exchanger as in Example 1, in the H-form in a glass beaker, there was added the amount of an aqueous guanylurea solution quivalent to the total capacity; stirring was effected at 20° C for 30 minutes, followed by suction drying. 1000 ml of a nitrogenous fertilizer were obtained which contained 2.2 moles of guanylurea per liter.

EXAMPLE 3

1100 ml of the ion exchanger as described in Example 1 were suspended in 2000 ml of water, and 2.3 moles of solid melamine were added. The suspension was stirred and heated to 80° C until all melamine had dissolved. After the reaction solution had cooled, the ion exchanger was rinsed three times with 1000 ml of cold water. There were obtained 1000 ml of a nitrogenous fertilizer which contained 2.2 moles of melamine per liter.

EXAMPLE 4

1000 ml of a weakly acid carboxyl ion exchanger (based on polyacrylic acid) which was crossed-linked with 6% divinylbenzene were, in the H-form, suspended in 2000 ml of water. The total capacity of the exchanger was 4.7 gram-equivalent per liter. To the suspension there was added an amount of guanidine carbonate equivalent to the total capacity of the exchanger and heating to 30° C was effected for 5 hours, with stirring; vigorous evolution of carbonic acid took place, subsequently, the ion exchanger was filtered off with suction and washed severla times with water. There were obtained 1450 ml. of a nitrogenous fertilizer which contained 2.95 moles of guanidine per liter.

EXAMPLE 5

1000 ml of the carboxyl ion exchanger as under Example 4 were suspended in 2000 ml of water, with stirring, and a sufficient amount of a 0.5 n guanylurea solution was added until the pH value of the reaction solution had risen to 8. The exchanger was then filtered off with suction and washed repeatedly with water. 1500 ml of a nitrogenous fertilizer were obtained which contained 2.8 moles of guanylurea per liter.

EXAMPLE 6

The same procedure was followed as described in Example 1, only that ammonia was used instead of guanidine. Here, too, 1000 ml of a nitrogenous fertilizer were formed which, however, contained 2.2 moles of ammonia.

Vegetation tests were carried out in Mitscherlich pots with grass on loamy sandy soil which has received a basal dressing of phosphorus and potash. The tests were carried out with a 60% water saturation, with reference to the water capacity of the soil. 5 cuts were made. The sum of the yields from the 1st and 2nd year is stated in Table 1. In this, the tests 1 – 3 and 6 relate to tests with sulphonic acid exchangers; the tests 4 – 5 relate to tests with carboxyl exchangers. Tests 1 – 5 illustrate the results with salts to be used according to the invention; tests 6 – 7 are comparative tests.

Table 1

| Fertilizer type | *gN/per pot | 1st year yield (g) | 2nd year yield (g) |
|---|---|---|---|
| 1. guanidine | 2 | 64 | 57 |
| 2. guanylurea | 2 | 65 | 61 |
| 3. melamine | 2 | 64 | 59 |
| 4. guanidine | 2 | 64 | 52 |
| 5. guanylurea | 2 | 63 | 55 |
| 6. NH$_4$ form | 2 | 48 | 35 |
| 7. Crotonylidene-diurea | 2 | 47 | 34 |

*gN = gramme Nitrogen

In order to ascertain the wash-out losses of the various nitrogenous fertilizers, in a second series of tests, 5 days before each cut the soil was saturated with water and sprinkled with 500 ml of water per pot. That corresponds to an amount of rain of 16 – 17 mm. The sum of the yield is stated in Table 2.

Table 2

| Fertilizer type | 1st year yield (g) | 2nd year yield (g) |
|---|---|---|
| 1. guanidine | 60 | 48 |
| 2. guanylurea | 61 | 50 |
| 3. melamine | 59 | 47 |
| 4. guanidine | 53 | 46 |
| 5. guanylurea | 51 | 45 |
| 6. NH$_4$ form | 44 | 30 |
| 7. Crotonylidene-diurea | 31 | 10 |

It will be understood that the specification and examples are illustrative but not limitative of the present invention and that other embodiments within the spirit and scope of the invention will suggest themselves to those skilled in the art.

What is claimed is:

1. Method of fertilizing crops or areas of crop cultivation which comprises applying to the area of crop cultivation fertilizingly effective amounts of a composition comprising a cation exchanger salt of a cation exchanger material selected from the group consisting of a cross linked sulfonated polystyrene and a crosslinked polyacrylic acid with a basic carbonic acid compound containing at least two nitrogen groupings selected from the group consisting of guanidine, guanylurea, melamine and diguanidine.

2. Method as claimed in claim 1 wherein said cation exchanger material is based on crosslinked polyacrylic acids.

3. Method as claimed in claim 1 wheren said cation exchanger material is based on crosslinked styrenes.

4. Method as claimed in claim 1 wherein said carbonic acid compound is guanidine.

5. Method according to claim 1 wherein the carbonic acid compound is guanylurea.

6. Method according to claim 1 wherein said carbonic acid compound is melamine.

7. Method according to claim 1 wherein said carbonic acid compound is diguanidine.

8. Method as claimed in claim 1 wherein said cation exchanger material is a cation exchanger in hydrogen form.

* * * * *